（12）United States Patent
Nishihiro et al.

(10) Patent No.: US 11,407,398 B2
(45) Date of Patent: Aug. 9, 2022

(54) CONTROL DEVICE FOR VEHICLE AND CONTROL METHOD FOR VEHICLE

(71) Applicants:JATCO Ltd, Fuji (JP); NISSAN MOTOR CO., LTD., Yokohama (JP)

(72) Inventors: Yoshimasa Nishihiro, Zama (JP); Masaharu Mochizulki, Atsugi (JP); Takashi Enomoto, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 262 days.

(21) Appl. No.: 16/640,821

(22) PCT Filed: Aug. 30, 2018

(86) PCT No.: PCT/JP2018/032182
§ 371 (c)(1),
(2) Date: Feb. 21, 2020

(87) PCT Pub. No.: WO2019/044997
PCT Pub. Date: Mar. 7, 2019

(65) Prior Publication Data
US 2021/0039625 A1   Feb. 11, 2021

(30) Foreign Application Priority Data
Aug. 30, 2017 (JP) .............................. JP2017-165381

(51) Int. Cl.
*B60W 20/10*  (2016.01)
*B60K 6/48*   (2007.10)
*B60W 10/06*  (2006.01)
*B60W 10/08*  (2006.01)

(52) U.S. Cl.
CPC ............... *B60W 20/10* (2013.01); *B60K 6/48* (2013.01); *B60W 10/06* (2013.01); *B60W 10/08* (2013.01); *B60K 2006/4808* (2013.01); *B60W 2520/10* (2013.01); *B60W 2540/103* (2013.01); *B60W 2710/0666* (2013.01); *B60W 2710/083* (2013.01); *B60Y 2200/92* (2013.01)

(58) Field of Classification Search
None
See application file for complete search history.

(56) References Cited

U.S. PATENT DOCUMENTS 9,623,867 B2 * 4/2017 Ashizawa ............. B60W 10/08
9,840,247 B2 * 12/2017 Sato ..................... B60W 10/08

FOREIGN PATENT DOCUMENTS

JP      2005051947 A  *  2/2005
JP         3624575 B2 *  3/2005
JP      2008-273460 A    11/2008
WO   WO-2015008394 A1 *  1/2015  ............. B60K 6/383

* cited by examiner

*Primary Examiner* — Dirk Wright
(74) *Attorney, Agent, or Firm* — Foley & Lardner LLP

(57) ABSTRACT

A control device for a vehicle includes a drive shaft, an engine coupled to the drive shaft, an electric motor coupled to the drive shaft, and a control unit. The control unit increases a torque of the electric motor when an accelerator pedal opening increases to equal to or more than a predetermined degree of opening during switching of driving sources, and decreases the torque of the electric motor while increasing the torque of the engine after a change of the torque of the engine turns to increase.

5 Claims, 7 Drawing Sheets

CONTROL DEVICE FOR VEHICLE AND CONTROL METHOD FOR VEHICLE

TECHNICAL FIELD

The present invention relates to a control device and a control method for a vehicle including an engine and an electric motor as driving sources.

BACKGROUND ART

JP2008-273460A discloses that, in a vehicle including an engine and a motor-generator as driving sources, the driving sources are switched by executing a control that gradually increases a torque of the motor-generator while gradually decreasing a torque of the engine when transitioning from a traveling mode (HEV mode) in which traveling is performed by both the engine and the motor-generator to a traveling mode (EV mode) in which traveling is performed by only the motor-generator.

SUMMARY OF INVENTION

According to a control disclosed in JP2008-273460A, a generation of a shock in association with switching of the driving sources can be suppressed when the traveling mode is transitioned from the HEV mode to the EV mode. However, in the above-described document, no measure is mentioned for the case where an accelerator pedal is pressed during the switching of the driving sources, in other words, while the torque of the engine is being decreased, and a return to the HEV mode is necessary.

An object of the present invention is to secure a driving response of a vehicle when an accelerator pedal is pressed during switching of driving sources.

According to an aspect of the present invention, a control device for a vehicle includes a drive shaft, an engine coupled to the drive shaft and an electric motor coupled to the drive shaft. The control device for the vehicle includes a control unit that increases a torque of the electric motor when an accelerator pedal opening increases to equal to or more than a predetermined degree of opening during switching of driving sources in which the torque of the electric motor is increased while a torque of the engine is decreased, and decreases the torque of the electric motor while increasing the torque of the engine after a change of the torque of the engine turns to increase.

According to another aspect of the present invention, a control method for a vehicle is provided. The vehicle includes a drive shaft, an engine coupled to the drive shaft and an electric motor coupled to the drive shaft. The control method for the vehicle includes increasing a torque of the electric motor when an accelerator pedal opening increases to equal to or more than a predetermined degree of opening during switching of driving sources in which the torque of the electric motor is increased while a torque of the engine is decreased, and decreasing the torque of the electric motor while increasing the torque of the engine after a change of the torque of the engine turns to increase.

The above-described configuration ensures securing a driving response of a vehicle while suppressing a generation of a shock when an accelerator pedal is pressed due to, for example, a change-of-mind of a driver during switching of driving sources.

DESCRIPTION OF EMBODIMENTS

The following describes embodiments of the present invention with reference to the drawings.

(Configuration of Vehicle Drive System)

Figure 1:
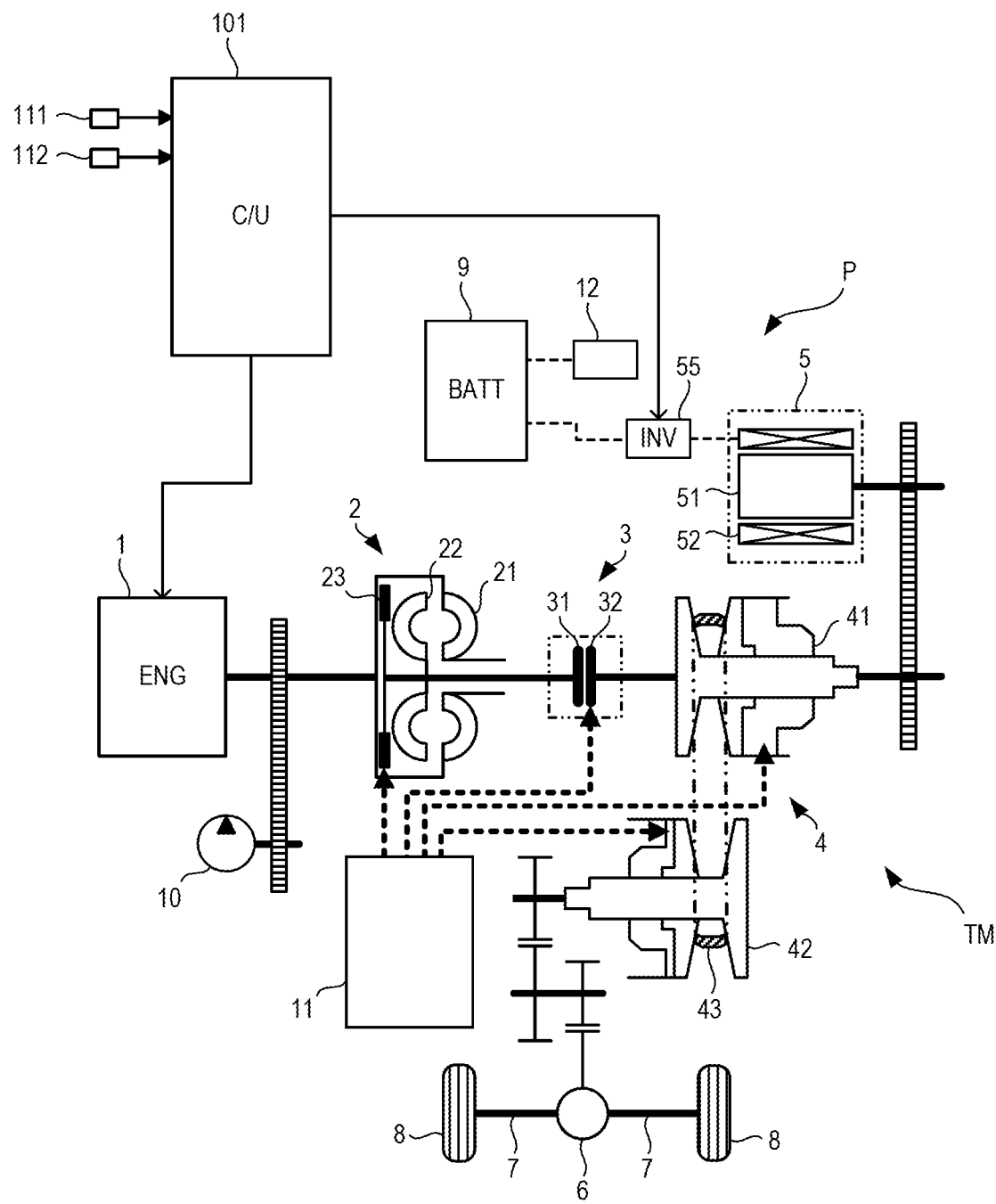
FIG. 1 is a schematic diagram illustrating an overall configuration of a vehicle drive system according to one embodiment of the present invention.

FIG. 1 schematically illustrates an overall configuration of a vehicle drive system P according to one embodiment of the present invention.

The vehicle drive system P includes an engine 1 and a motor-generator 5 as driving sources. The engine 1 and the motor-generator 5 are both coupled to right and left driving wheels 8. On a power transmission path coupling the engine 1 to the driving wheels 8, an automatic transmission TM is interposed. The motor-generator 5 is coupled to the driving wheels 8 via the automatic transmission TM (specifically, a variator 4). While in the embodiment, the engine 1 and the motor-generator 5 are coupled in parallel to the variator 4 via independent power transmission paths, the engine 1 and the motor-generator 5 may be disposed on an identical power transmission path that extends from the variator 4.

The automatic transmission TM is a continuously variable transmission, and includes a torque converter 2, a clutch 3, and the variator 4 in an order from a side close to the engine 1 on the power transmission path approaching the driving wheels 8. The automatic transmission TM converts a rotative power input from the engine 1 and the motor-generator 5 at a predetermined speed ratio, and outputs to the driving wheels 8 via a differential gear 6.

The torque converter 2 includes a pump impeller 21 coupled to an input shaft of the torque converter 2 and a turbine runner 22 coupled to an output shaft of the torque converter 2, and transmits the input rotative power to the output shaft via a fluid dynamic action. The torque converter 2 further includes a lock-up clutch 23 coupled to the output shaft, and directly couples the input shaft to the output shaft of the torque converter 2 by bringing the lock-up clutch 23 into an engaged state to ensure reducing a transmission loss due to a fluid connection. An engagement and a disengagement of the lock-up clutch 23 can be switched by controlling a hydraulic pressure affecting the lock-up clutch 23.

The clutch 3 is disposed between the torque converter 2 and the variator 4, and includes a friction engaging element (hereinafter referred to as an "input element") 31 coupled to a crankshaft (an output shaft of the torque converter 2 in this embodiment) of the engine 1 and a friction engaging element (hereinafter referred to as an "output element") 32 coupled to the input shaft (specifically, a rotation shaft of a primary pulley 41) of the variator 4. The clutch 3 engages and disengages the input element 31 and the output element 32 to couple and cuts off the engine 1 to/from the variator 4 and the driving wheels 8. The operation of the clutch 3 is controlled by adjusting the hydraulic pressure affecting the input element 31 or the output element 32.

The variator 4 includes the primary pulley 41 and a secondary pulley 42 as variating elements, and includes a metal belt 43 wound between this pair of pulleys 41 and 42. The variator 4 ensures steplessly changing a speed ratio by changing a ratio of a contact diameter of the metal belt 43 on the primary pulley 41 and the secondary pulley 42. The speed ratio of the variator 4 is controlled by adjusting the hydraulic pressure affecting movable sheaves of the primary pulley 41 and the secondary pulley 42, and changing widths of V-grooves formed between the movable sheaves and fixed sheaves.

The motor-generator 5 can function as an electric generator not only functioning as an electric motor. It is possible to employ an electric motor operable only as the electric motor, instead of the motor-generator 5. The motor-generator 5 includes a rotor 51 coupled to the output shaft and a stator 52 disposed in a concentric manner with the rotor 51 in the peripheral area of the rotor 51. By controlling a supply of the electric power to an electromagnetic coil disposed in the stator 52, the motor-generator 5 can function as the electric motor to generate a torque. The torque of the motor-generator 5 is transmitted to a rotation shaft of the variator 4 (an input shaft and the rotation shaft of the primary pulley 41 in this embodiment) via a power transmission medium, such as a gear. The supply of the electric power to the motor-generator 5 is controlled by a power control unit in which an inverter 55 is incorporated. A direct current supplied from a battery 9 is converted into a three-phase alternating current by the inverter 55, and is supplied to the motor-generator 5. Meanwhile, the alternating current generated by a regeneration operation of the motor-generator 5 is converted into a direct current by the inverter 55, and is supplied to the battery 9. The battery 9 is rechargeable by the current supplied from the motor-generator 5.

A rotative power after shifting that is output from the automatic transmission TM is transmitted to a drive shaft 7 via a gear train set to a predetermined gear ratio and the differential gear 6 to rotate the driving wheels 8. Thus, in the embodiment, while the engine 1 is coupled to the drive shaft 7 by the clutch 3 in a disengageable/engageable manner, the motor-generator 5 is coupled to the drive shaft 7 without via the clutch 3. Not only limited to the engine 1 and the drive shaft 7, but it is obvious that the motor-generator 5 may be coupled to the drive shaft 7 by interposing a clutch in a disengageable/engageable manner between the motor-generator 5 and the drive shaft 7.

The embodiment includes the lock-up clutch 23 of the torque converter 2, the input element 31 and the output element 32 of the clutch 3, and a mechanical drive type oil pump 10 as a source of generation of the hydraulic pressure affecting the variating elements 41 and 42 of the variator 4. The oil pump 10 is driven by a rotative power of the engine 1, increases the hydraulic oil pressure, and supplies the hydraulic oil to each portion via a hydraulic pressure control circuit 11. FIG. 1 illustrates hydraulic pressure supply passages from the hydraulic pressure control circuit 11 to each portion by dotted lines with arrow heads.

The embodiment includes an electrically operated type oil pump 12 in addition to the oil pump 10. The oil pump 12 is actuated by an electric power supplied from the battery 9, and increases the hydraulic oil pressure. The hydraulic oil after being increased can be supplied to each portion via the hydraulic pressure control circuit 11 similarly to the case by the oil pump 10. The electrically operated type oil pump 12 can, for example, control the hydraulic pressure applied to the clutch 3 during a stop of the engine 1.

(Configuration and Basic Operation of Control System)

Operations of the engine 1 and the motor-generator 5 are controlled by a controller 101. It is also possible to configure as a combination of an engine controller and a motor-generator controller by distributing functions possessed by the controller 101 relating to the control of the engine 1 and the motor-generator 5 to a plurality of controllers. The controller 101 is configured as an electronic control unit, and is formed of a central processing unit (CPU), various kinds of storage devices, such as a RAM and a ROM, and a microcomputer including, for example, input/output interfaces.

The controller 101 is one that provides a function of a "control unit" according to the embodiment, and a "control device for a vehicle" according to the embodiment is configured by including the drive shaft 7, the engine 1, and the motor-generator 5 besides the controller 101. While in the embodiment, the rotation shaft (hereinafter, referred to as an "output shaft" in some cases) 7 coupled to the driving wheels 8 is supposed to be a "drive shaft," the "drive shaft" is not limited to the output shaft 7, and may be any shaft that can transmit the rotative power from the engine 1 and the motor-generator 5 to the driving wheels 8, such as a rotation shaft of the primary pulley 41 or a rotation shaft of the secondary pulley 42. In this sense, the "control device for a vehicle" can be configured by including the rotation shaft of the primary pulley 41 or the like instead of the output shaft 7.

In the embodiment, a signal from an accelerator sensor 111 that detects an operation amount (hereinafter, referred to as an "accelerator pedal opening") APO of the accelerator pedal by a driver, and a signal from a vehicle speed sensor 112 that detects a vehicle traveling speed (hereinafter, referred to as a "vehicle speed") VSP are input to the controller 101 in relation to a driving force control of the vehicle, as well as signals from various kinds of sensors that detect, for example, a rotation speed NE of the engine 1, a temperature TW of a cooling water of the engine 1, a rotation speed Npri of the primary pulley 41, a rotation speed Nsec of the secondary pulley 42, a pressure Ppri of the hydraulic oil affecting the primary pulley 41, a pressure Psec of the hydraulic oil affecting the secondary pulley 42, a temperature Toil of the hydraulic oil of the automatic transmission TM, and a position SFT of a shift lever, are input. In the embodiment, the vehicle speed sensor 112 is disposed to be able to measure a rotation speed of the drive shaft 7, and the controller 101 calculates the vehicle speed VSP on the basis of a signal from the vehicle speed sensor 112.

The controller 101 determines a region to which a current operating state of the vehicle belongs on the basis of the various kinds of signals, such as the accelerator pedal opening APO and the vehicle speed VSP, and switches the driving sources between the engine 1 and the motor-generator 5 corresponding to its determination result. Specifically, while the motor-generator 5 serves as the driving source in an operating range (hereinafter, referred to as a "first region") R1 on a low load side with the accelerator pedal opening APO being less than a predetermined degree of opening APO1, the engine 1 serves as the driving source in an operating range (hereinafter, referred to as a "second region") R2 on a high load side with the accelerator pedal opening APO being equal to or more than the predetermined degree of opening APO1. Thus, in the embodiment, the driving source is alternatively selected between the engine 1 and the motor-generator 5. However, while only the motor-generator 5 serves as the driving source in the first region R1, the engine 1 and the motor-generator 5 may be used in combination as the driving source in the second region R2 to execute a torque assist by the motor-generator 5.

Figure 4:
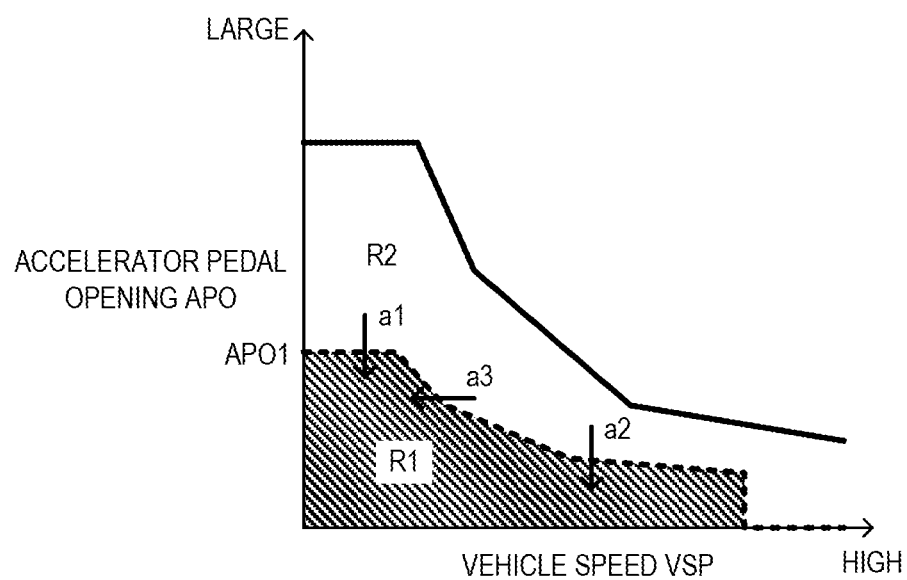
FIG. 4 is an explanatory diagram illustrating a trend of an operating range map according to the one embodiment of the present invention.

FIG. 4 illustrates an exemplary operating range map. The operating range map is defined by the accelerator pedal opening APO and the vehicle speed VSP, and, on the basis of the degree of opening APO1 preliminarily determined corresponding to the vehicle speed VSP, the region less than the predetermined degree of opening APO1 (illustrated with diagonal lines) corresponds to the first region R1 and the region equal to or more than the predetermined degree of opening APO1 corresponds to the second region R2. While in the embodiment, the predetermined degree of opening APO1 is set to a different value depending on the vehicle speed VSP, specifically, set to a small value as the vehicle speed VSP is in a high region, it is also possible to set the predetermined degree of opening APO1 to a constant value. The controller 101 compares the current accelerator pedal opening APO with the predetermined degree of opening APO1 on the basis of the vehicle speed VSP to determine the regions R1 and R2 to which the operating states belong.

When the accelerator pedal opening APO is less than the predetermined degree of opening APO1, and the motor-generator 5 is selected as the driving source, the engine 1 is stopped and the clutch 3 is disengaged. The traveling in such a state is referred to as an "EV traveling." Meanwhile, when the accelerator pedal opening APO is equal to or more than the predetermined degree of opening APO1, and the engine 1 is selected as the driving source, the supply of the electric power to the motor-generator 5 is stopped and the clutch 3 is engaged to ensure the transmission of the rotative power to the drive shaft 7 from the engine 1. The traveling in such a state is referred to as an "engine traveling."

When the accelerator pedal is returned from the state where the accelerator pedal opening APO is equal to or more than the predetermined degree of opening APO1, and the operating state is transitioned from the second region R2 to the first region R1, to switch the driving source from the engine 1 to the motor-generator 5, in other words, when switching from the engine traveling to the EV traveling, the controller 101 executes a control to, while gradually decreasing the torque of the engine 1, gradually increase the torque of the motor-generator 5 corresponding to the decrease of the engine torque. This suppresses the generation of the shock in association with the switching of the driving sources. The switching of the driving sources from the engine 1 to the motor-generator 5 also occurs, not limited to when the accelerator pedal opening APO is decreased due to returning of the accelerator pedal by the driver so as to cross over a switching line (=APO1) to a side of the first region R1, but even when a travelling resistance is increased and the vehicle speed VSP is decreased, such as when the vehicle approaches an uphill road from a flat road, without no change in the position of the accelerator pedal itself. FIG. 4 indicates an exemplary case of the switching caused by the driver returning the accelerator pedal by arrows a1 and a2, and an exemplary case of the switching caused by the increase of the travelling resistance by an arrow a3.

Here, the case where, during the switching of the driving sources, the accelerator pedal is pressed, and the accelerator pedal opening APO is increased to equal to or more than the predetermined degree of opening APO1 again is assumed. Such a situation corresponds to, for example, when the driver who once returns the accelerator pedal with the intention to decelerate has a change-of-mind to reaccelerate, or when, after the vehicle approaches the uphill road, the driver who feels the insufficient vehicle speed presses the accelerator pedal with the intention to accelerate.

In this case, the driving source is returned to the engine 1 in order to switch from the EV traveling to the engine traveling again, and a fuel injection quantity to the engine 1 is increased in order to ensure outputting the engine torque corresponding to the accelerator pedal opening APO after the increase. However, there exists a delay in the torque of the engine 1 until it actually starts to be increased since a torque increase instruction to the engine 1, in other words, since an increase instruction of the fuel injection quantity. Therefore, only simply outputting the torque increase instruction to the engine 1 in response to the increase of the accelerator pedal opening APO causes a shortage in the torque transmitted to the drive shaft 7 (hereinafter, referred to as a "drive shaft torque").

Therefore, in the embodiment, in response to the increase of the accelerator pedal opening APO during the switching of the driving sources from the engine 1 to the motor-generator 5, a control to increase the torque of the motor-generator 5 is executed in conjunction with the torque increase instruction to the engine 1. This compensates the delay in the engine torque with the torque of the motor-generator 5 to secure a driving response of the vehicle. The control executed by the controller 101 regarding the switching of the driving sources will be described with reference to the following flowchart.

(Content of Driving Source Switching Control)

Figure 2:
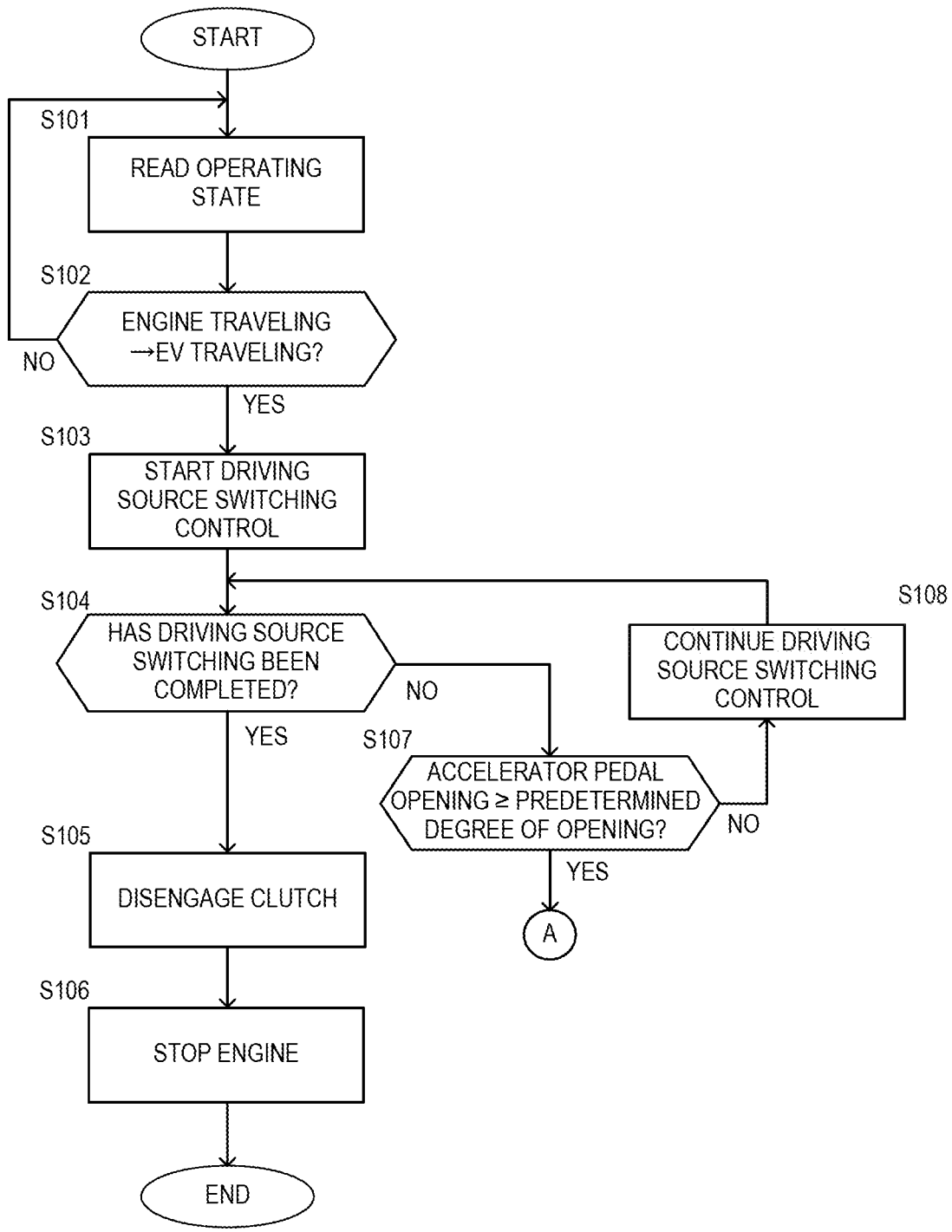
FIG. 2 is a flowchart illustrating a basic procedure of a driving source switching control (switching from engine traveling to EV traveling) according to the embodiment.

FIG. 2 illustrates a basic procedure of the driving source switching control with a flowchart.

At S101, the signals indicative of the operating state of the vehicle, such as the accelerator pedal opening APO and the vehicle speed VSP, are read.

At S102, it is determined whether the condition is satisfied for the transition from the engine traveling to the EV traveling or not. Specifically, it is determined whether the operating state has transitioned from the second region R2 where the accelerator pedal opening APO is equal to or more than the predetermined degree of opening APO1 to the first region R1 where the accelerator pedal opening APO is less than the predetermined degree of opening APO1 or not. When the operating state is transitioned to the first region R1, and the condition is satisfied for the transition from the engine traveling to the EV traveling, the process proceeds to S103, and when it is not in such a condition, the process returns to S101 to repeatedly execute the process at S101 and 102.

At S103, the switching of the driving sources is started. In the embodiment, the control to increase the torque of the motor-generator 5 while decreasing the torque of the engine 1 is executed, and, for example, while gradually decreasing the torque of the engine 1, the torque of the motor-generator 5 is increased corresponding to the decrease of the engine torque. The decrease of the engine torque is, for example, caused by changing the fuel injection quantity of the engine 1 at a decrease rate that ensures the suppressed shock in association with the switching. The torque of the motor-generator 5 is increased so as to compensate for the shortage amount of the engine torque with respect to the drive shaft torque corresponding to the accelerator pedal opening APO.

At S104, it is determined whether the switching of the driving sources from the engine 1 to the motor-generator 5 is completed or not. For example, it is determined whether the fuel injection quantity of the engine 1 is decreased down to a preliminarily set fuel cut injection quantity or zero or not. When the fuel injection quantity is sufficiently decreased, and the switching of the driving sources is completed, the process proceeds to S105, and when it is not yet completed, in other words, when the fuel injection quantity is not decreased down to the fuel cut injection quantity or zero, and it is during the switching of the driving sources, the process proceeds to S107.

At S105, the clutch 3 is disengaged to cut off the transmission of the rotative power to the drive shaft 7 from the engine 1. That is, in the embodiment, after the accelerator pedal opening APO is decreased to less than the predetermined degree of opening APO1, and the operating state is transitioned to the first region R1, the clutch 3 is not disengaged, and the engaged state is maintained until the switching of the driving sources to the motor-generator 5 is completed.

At S106, the supply of the fuel to the engine 1 is stopped to stop the engine 1.

At S107, it is determined whether the accelerator pedal opening APO is increased to equal to or more than the predetermined degree of opening APO1 or not, in other words, after the operating state is transitioned from the second region R2 on the high load side to the first region R1 on the low load side, whether the operating state is transitioned to the second region R2 again or not. When the accelerator pedal opening APO is increased to equal to or more than the predetermined degree of opening APO1, the process proceeds to S201 illustrated in FIG. 3, and when the accelerator pedal opening APO is not increased to equal to or more than the predetermined degree of opening APO1, that is, when the accelerator pedal opening APO still remains in less than the predetermined degree of opening APO1, the process proceeds to S108.

At S108, the switching of the driving sources is continued, and the torque of the motor-generator 5 is increased while decreasing the torque of the engine 1.

At S201, the torque increase instruction is output to the engine 1 in order to switch the driving sources to the engine 1 again. Specifically, a target value of the engine torque that ensures achieving the drive shaft torque corresponding to the accelerator pedal opening APO after the increase is set, and the fuel injection quantity of the engine 1 is increased on the basis of this target engine torque.

At S202, the torque of the motor-generator 5 is controlled to increase the torque of the motor-generator 5 so as to compensate for the shortage amount of the actual engine torque with respect to the target drive shaft torque. In the embodiment, this increases an inclination of the torque change generated by the motor-generator 5 more than that before the transition of the operating range, in other words, before the accelerator pedal opening APO is increased to equal to or more than the predetermined degree of opening APO1. While the actual engine torque may be detected by installing a sensor at an appropriate rotating shaft, such as the input shaft of the torque converter 2, it is also possible to detect by an estimation calculation based on the current engine torque and the target engine torque by approximating the delay of the actual engine torque with respect to the target engine torque as a primary delay.

At S203, it is determined whether the change of the torque of the engine 1 is shifted to an increase or not. Whether the torque of the engine 1 has reached a predetermined value or not after being shifted to the increase may be determined, not only the change of the engine torque being shifted to the increase. This ensures obtaining an effect to compensate the shortage amount caused by the delay of the engine torque with the torque of the motor-generator 5 with more certainty.

At S204, decreasing the torque of the motor-generator 5 so as to be in coordination with the increase of the engine torque achieves the drive shaft torque corresponding to the accelerator pedal opening APO, in other words, the drive shaft torque desired by the driver.

At S205, matching of the torque of the engine 1 and the drive shaft torque completes the switching of the driving sources to the engine 1. This completes the transition to the engine traveling, and the vehicle travels using the engine 1 as the driving source. Thus, in the embodiment, the accelerator pedal opening APO is increased to equal to or more than the predetermined degree of opening APO1 during the switching of the driving sources, and when the driving source is returned to the engine 1, the clutch 3 is maintained in the engaged state through the whole control from the start of the driving source switching control (S103) to the completion of the return to the engine 1 (S205).

Figure 3:
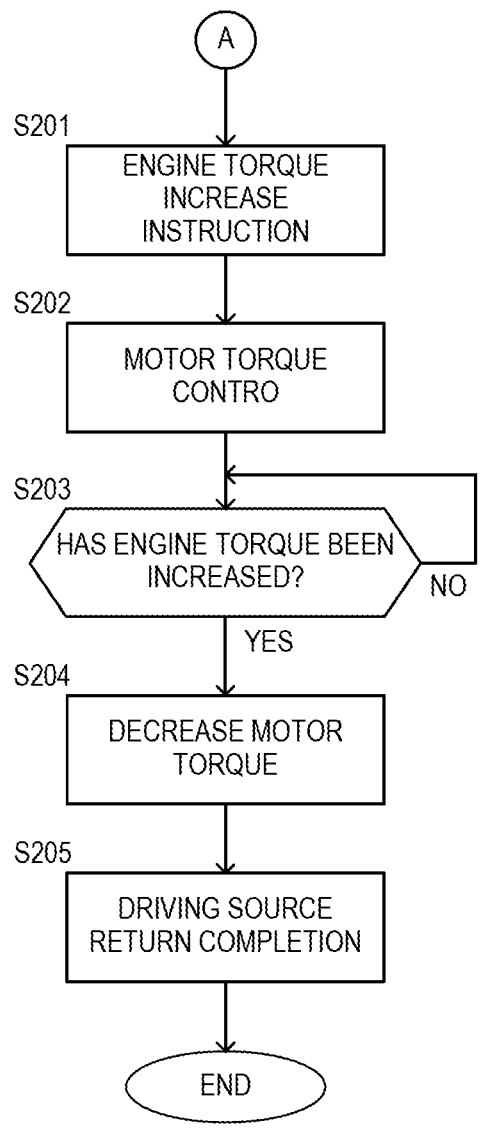
FIG. 3 is a flowchart illustrating a content of a process relating to returning to the engine traveling of the driving source switching control.

In the embodiment, the functions of the "control unit" are achieved by the processes at S102 to 104, S107, and S108 in the flowchart illustrated in FIG. 2, and the processes at S201 to 204 in the flowchart illustrated in FIG. 3.

(Description of Operation by Timing Chart)

Figure 5:
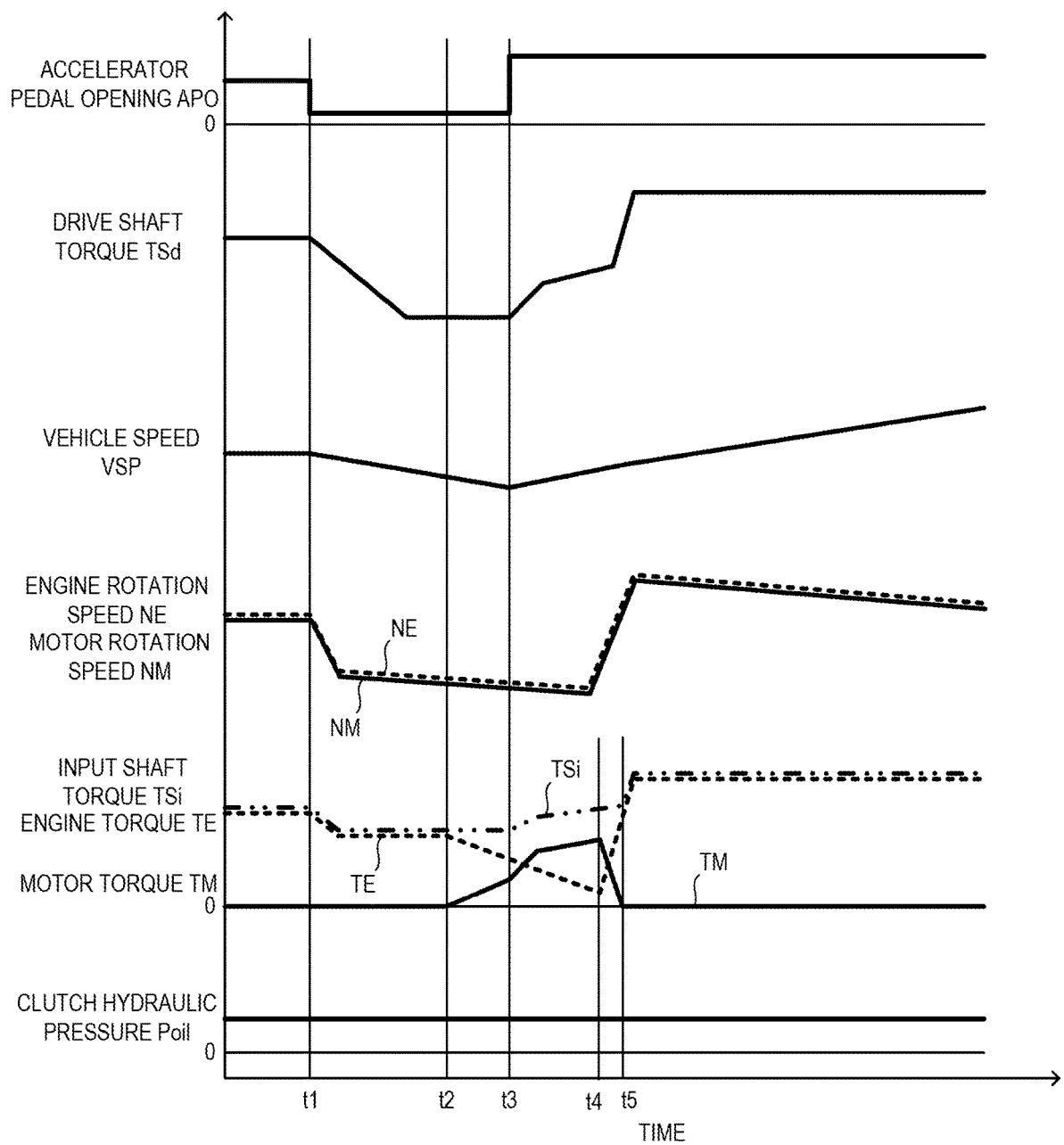
FIG. 5 is an explanatory diagram illustrating an operation of the vehicle drive system by the driving source switching control according to the embodiment.
Figure 6:
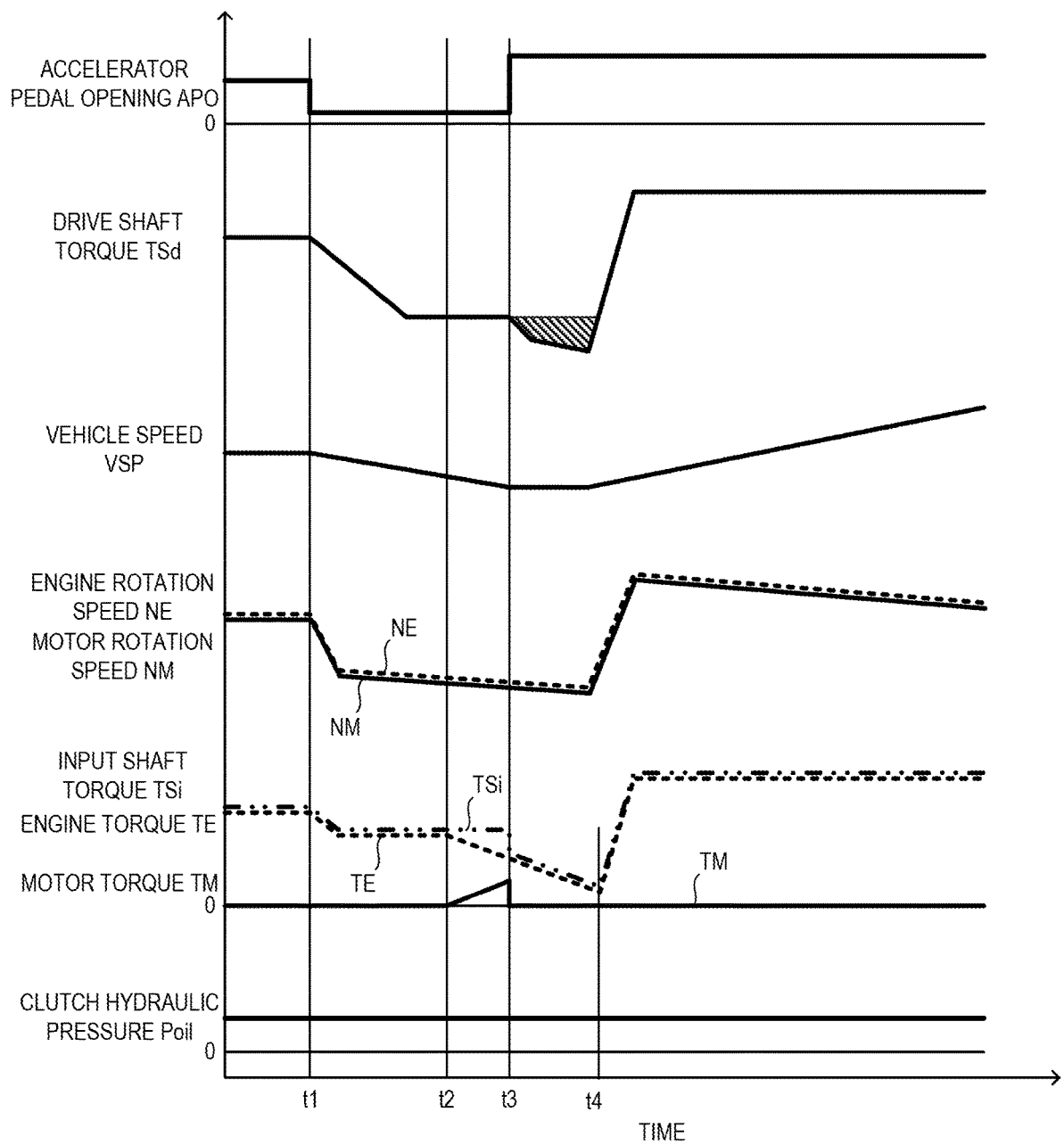
FIG. 6 is an explanatory diagram illustrating an operation of a vehicle drive system according to a comparative example.

FIG. 5 schematically illustrates an operation of a vehicle drive system P by the driving source switching control according to the embodiment by a timing chart, and FIG. 6 illustrates the operation by the comparative example. In both FIGS. 5 and 6, a rotational speed NE and a torque TE of the engine 1 are indicated by dotted lines, and a rotational speed NM and a torque TM of the motor-generator 5 are indicated by solid lines. Furthermore, a torque (input shaft torque) TSi applied to the input shaft of the variator 4 is indicated by a two-dot chain line.

For ease of understanding the case of the embodiment (FIG. 5), first, the case of the comparative example (FIG. 6) will be described, and next, the operation by the control according to the embodiment will be described.

In FIG. 6, the control to switch the driving sources from the engine 1 to the motor-generator 5 is executed in order to transition from the engine traveling to the EV traveling when the accelerator pedal is returned from a state where the operating state is in a medium load region (APO APO1) to be transitioned to the low load region (the first region R1) where the accelerator pedal opening APO is less than the predetermined degree of opening APO1 (time t1). The controller 101 outputs an instruction to decrease the fuel injection quantity to the engine 1. In conjunction with this, the controller 101 increases the torque of the motor-generator 5 corresponding to the decrease of the engine torque (time t2) to suppress the generation of the shock in association with the switching of the driving sources. When the fuel injection quantity is decreased to the fuel cut injection quantity or zero, the supply of the fuel to the engine 1 is stopped to complete the switching of the driving sources to the motor-generator 5 and the transition to the EV traveling. Here, during the switching of the driving sources, specifically, during the torque of the engine 1 is decreased, in the case where the accelerator pedal is pressed due to, for example, a change-of-mind of the driver, and the accelerator pedal opening APO is increased to be equal to or more than the predetermined degree of opening APO1 again (time t3), it is necessary to return the driving source to the engine 1 in order to allow the drive shaft torque TSd corresponding to the accelerator pedal opening APO after the increase to be achieved. In the comparative example, while the torque increase instruction is output to the engine 1, the supply of the electric power to the motor-generator 5 is stopped to sharply decrease the torque of the motor-generator 5. Since the torque increase instruction to the engine 1 until the engine torque actually starts to be increased (time t4), there is a delay corresponding to the operation property of the engine 1. Therefore, in the drive shaft torque TSd, there is generated a shortage for an amount corresponding to the delay of the engine torque. In FIG. 6, the shortage amount of the drive shaft torque TSd caused by the delay of the engine torque is indicated by the diagonal line.

Now, the operation by the control according to the embodiment will be described. In FIG. 5, the operation from time t1 where the accelerator pedal is returned to transition the operating state to the first region R1 on the low load side to time t3 where the accelerator pedal is pressed by, for example, a change-of-mind of the driver during the switching of the driving sources to increase the accelerator pedal opening APO to equal to or more than the predetermined degree of opening APO1 again is similar to that of the comparative example.

In the case of the embodiment, while the torque increase instruction is output to the engine 1 in response to the increase of the accelerator pedal opening APO, a torque TM of the motor-generator 5 is increased more than that when the accelerator pedal opening APO is increased (time t3), and afterwards, the torque TM of the motor-generator 5 is decreased when the change of an actual engine torque TE is shifted to the increase (time t4). Specifically, in order to allow the drive shaft torque TSd corresponding to the accelerator pedal opening APO after the increase to be achieved, the torque corresponding to the actual shortage amount of the engine torque with respect to the target value of the drive shaft torque TSd is generated by the motor-generator 5. This compensates the shortage amount of the drive shaft torque TSd caused by the delay after the torque increase instruction until the engine torque TE actually starts to be increased with the torque TM of the motor-generator 5, and ensures securing the driving response of the vehicle in response to the increase of the accelerator pedal opening APO. FIG. 5 illustrates a state where the inclination in the change of the torque TM of the motor-generator 5 is increased more than that before the increase of the accelerator pedal opening APO in response to the increase of the accelerator pedal opening APO, and furthermore, the change of the torque TM of the motor-generator 5 is also shifted to the decrease from the increase at time t4 where the change of the actual engine torque TE is shifted to the increase from the decrease. At time t5 where the torque TM of the motor-generator 5 is decreased to zero, the torque TE of the engine 1 and the drive shaft torque TSd match to complete the switching of the driving sources to the engine 1. Afterwards, the traveling is performed with the engine 1 as the driving source.

Figure 7:
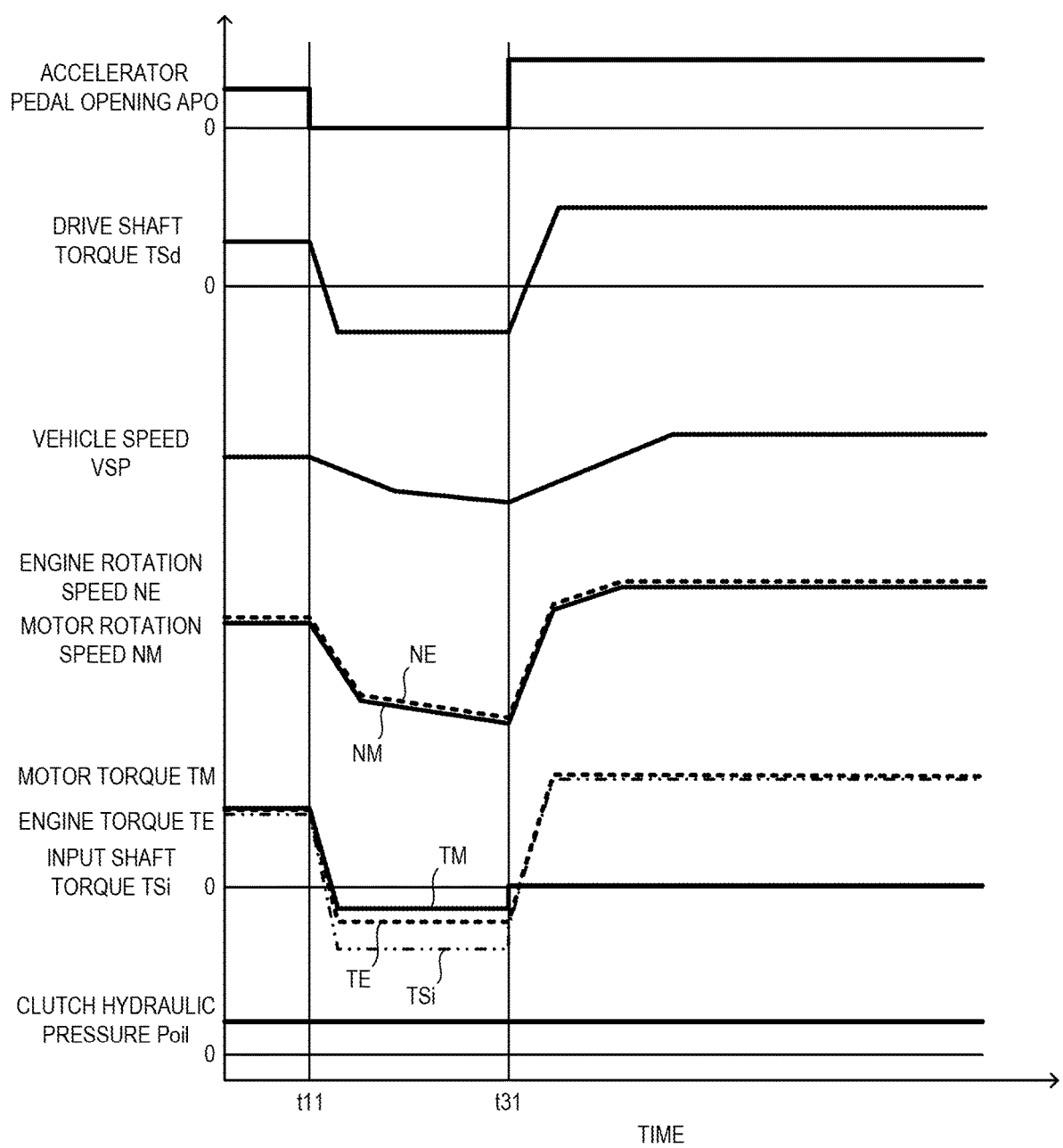
FIG. 7 is an explanatory diagram illustrating an operation of the vehicle drive system when transitioned to an accelerator off state.

FIG. 7 illustrates a case where the accelerator pedal is returned to a state of accelerator off (APO=0) from the state where the operating state is in the medium load region (APO≥APO1) (time t11), and the supply of the fuel to the engine 1 is stopped. In this case, the switching of the driving sources is not performed, and the engine 1 continuously serves as the driving source. However, in this embodiment, maintaining the clutch 3 in the engaged state and operating the motor-generator 5 as the electric generator increase the load applied to the drive shaft 7 from the engine 1 and the motor-generator 5. When the accelerator pedal is pressed and the accelerator pedal opening APO is increased (time t31), the regeneration operation of the motor-generator 5 is stopped and the supply of the fuel to the engine 1 is resumed.

(Description of Operational Advantage)

The control device for the vehicle according to the embodiment is configured as described above. The following describes the effects obtained by the embodiment.

First, during the switching of the driving sources, in the embodiment, when the accelerator pedal opening APO is increased to equal to or more than the predetermined degree of opening APO1 during the switching of the driving sources from the engine 1 to the motor-generator 5, in other words, when the switching line (=APO1) is crossed over toward the second region R2 on the high load side due to the increase of the accelerator pedal opening APO after the operating state is transitioned to the first region R1 on the low load side in the operating range map illustrated in FIG. 4, increasing the torque TM of the motor-generator 5 compensates the delay of the engine torque TE after the torque increase instruction until the torque TE of the engine 1 actually starts to be increased to ensure suppressed generation of the shortage in the drive shaft torque TSd. After the change of the engine torque TE is shifted to the increase, decreasing the torque TM of the motor-generator 5 while increasing the torque TE of the engine ensures achieving the target drive shaft torque TSd while suppressing the generation of the shock caused by the rapid decrease of the torque TM of the motor-generator 5. Thus, with the embodiment, when the accelerator pedal is pressed due to, for example, a change-of-mind of the driver during the switching of the driving sources, the driving sources are appropriately controlled to ensure securing the driving response of the vehicle while suppressing the generation of the shock.

Second, setting the accelerator pedal opening (predetermined degree of opening APO1) that determines the switching line of the driving sources to a different value depending on the vehicle speed VSP ensures utilizing the operation properties of both the engine 1 and the motor-generator 5 to contribute to establish the efficient vehicle drive system P.

Third, when the accelerator pedal is completely returned from the state where the operating state is in the second region R2 to be in the state of accelerator off (APO=0), continuously using the engine 1 as the driving source and maintaining the clutch 3 in the engaged state ensure utilizing the engine brake and ensure securing the response at reacceleration. Furthermore, causing the motor-generator 5 to operate as the electric generator, and recharging the electric power generated by the electric generation to the battery 9 ensure improved efficiency of the whole vehicle drive system P.

The concepts extracted from the above description other than those described in claims are brought together below.

First, it is a control device for a vehicle. The vehicle includes a drive shaft, an engine coupled to the drive shaft, and an electric motor coupled to the drive shaft. The control device for the vehicle includes a control unit that, when an accelerator pedal opening is increased to be equal to or more than a predetermined degree of opening during switching of driving sources which decreases a torque of the engine gradually and increases a torque of the electric motor corresponding to a decrease of the engine torque, gives an instruction to increase a torque to the engine, and increases a changing rate of a torque of the electric motor more than the changing rate of the torque of the electric motor before the accelerator pedal opening is increased to equal to or more than the predetermined degree of opening.

Second, it is the control device for the vehicle in which, after the accelerator pedal opening is increased to equal to or more than the predetermined degree of opening, the control unit sets a target torque of the engine corresponding to the accelerator pedal opening after the increase, and decreases the torque of the electric motor while increasing the torque of the engine toward the target torque.

Third, it is the control device for the vehicle in which the predetermined degree of opening has a different value depending on a vehicle speed.

Fourth, it is the control device for the vehicle in which the control unit has a second region where the accelerator pedal opening is equal to or more than the predetermined degree of opening as an operating range where a traveling is performed by the engine, and a first region where the accelerator pedal opening is less than the predetermined degree of opening (excluding accelerator off state) as an operating range where a traveling is performed by the electric motor. The control unit executes the switching of the driving sources when the operating state is transitioned from the second region to the first region.

Fifth, it is the control device for the vehicle in which the control unit increases a load applied to the drive shaft from the engine and the electric motor when an accelerator-on state is changed to an accelerator-off state.

While the embodiment of the present invention has been described above, the present invention is not limited to this, and it is needless to mention that various changes and modifications can be made within a range of the matter disclosed in the claims.

The present application claims a priority of Japanese Patent Application No. 2017-165381 filed with the Japan Patent Office on Aug. 30, 2017, all the contents of which are hereby incorporated by reference.

The invention claimed is:

1. A control device for a vehicle, comprising:
a drive shaft;
an engine coupled to the drive shaft;
an electric motor coupled to the drive shaft; and
a controller configured to increase a torque of the electric motor more than the torque of the electric motor before an accelerator pedal opening increases to equal to or more than a predetermined degree of opening when the accelerator pedal opening increases to equal to or more than the predetermined degree of opening during switching of driving sources in which the torque of the electric motor is increased while a torque of the engine is decreased, and decrease the torque of the electric motor while increasing the torque of the engine after a change of the torque of the engine turns to increase in association with the accelerator pedal opening increasing to equal to or more than the predetermined degree of opening.

2. The control device for the vehicle according to claim 1, wherein
the predetermined degree of opening has a different value depending on a vehicle speed.

3. The control device for the vehicle according to claim 1, wherein
when an accelerator-on state is changed to an accelerator-off state, the controller increases a load applied to the drive shaft from the engine and the electric motor.

4. A control method for a vehicle, the vehicle including a drive shaft, an engine coupled to the drive shaft, and an electric motor coupled to the drive shaft, the control method comprising:
increasing a torque of the electric motor more than the torque of the electric motor before an accelerator pedal opening increases to equal to or more than a predetermined degree of opening when the accelerator pedal opening increases to equal to or more than the predetermined degree of opening during switching of driving sources in which the torque of the electric motor is increased while a torque of the engine is decreased, and
decreasing the torque of the electric motor while increasing the torque of the engine after a change of the torque of the engine turns to increase in association with the accelerator pedal opening increasing to equal to or more than the predetermined degree of opening.

5. A control device for a vehicle, comprising:
a drive shaft;
an engine coupled to the drive shaft;
an electric motor coupled to the drive shaft;
means for increasing a torque of the electric motor more than the torque of the electric motor before an accelerator pedal opening increases to equal to or more than a predetermined degree of opening when the accelerator pedal opening increases to equal to or more than the predetermined degree of opening during switching of driving sources in which the torque of the electric motor is increased while a torque of the engine is decreased; and
means for decreasing the torque of the electric motor while increasing the torque of the engine after a change of the torque of the engine turns to increase in association with the accelerator pedal opening increasing to equal to or more than the predetermined degree of opening.

* * * * *